United States Patent [19]
Williams et al.

[11] Patent Number: 5,747,804
[45] Date of Patent: May 5, 1998

[54] METHOD AND APPARATUS FOR SENSING INFRARED RADIATION UTILIZING A MICRO-ELECTRO-MECHANICAL SENSOR

[75] Inventors: Ronald L. Williams, Fallbrook; Paul R. Norton, Santa Barbara, both of Calif.

[73] Assignee: Raytheon Company, Lexington, Mass.

[21] Appl. No.: 713,560

[22] Filed: Sep. 13, 1996

[51] Int. Cl.$^6$ .................................................. G01J 5/00
[52] U.S. Cl. ............................................................ 250/338.1
[58] Field of Search ............................ 250/338.1; 73/763

[56]   References Cited

U.S. PATENT DOCUMENTS 5,265,470  11/1993  Kaiser et al. ........................ 250/338.1
5,436,452   7/1995  Kenny et al. ........................ 250/338.1

OTHER PUBLICATIONS

Barnes et al. "Photothermal Spectroscopy with Femtojoule Sensitivity Using a Micromechanical Device", Nature 372, Nov. 1994, pp. 79–81.

Primary Examiner—Michael J. Tokar
Assistant Examiner—Richard Hanig
Attorney, Agent, or Firm—W. C. Schubert; G. H. Lenzen, Jr.

[57]   ABSTRACT

Apparatus (102, 202, 302) and method for tunneling rate infrared detection devices formed on a single substrate (100). A counter electrode (104, 207) having a plurality of portions extending from the substrate (100) with the counter electrode (104, 207) suspended above the substrate (100) at a distance from a tunneling electrode (116) so that a tunneling current flows through the counter electrode (104, 207) and tunneling electrode (116) in response to an applied bias voltage. The counter electrode (104, 207) and tunneling electrodes (116) form a circuit that produces an output signal. A force applied to the sensor (102, 202, 302) urges the counter electrode (104, 207, 304) to deflect relative to the tunneling electrode (116) to modulate the output signal. The output signal is a control voltage that is applied between the counter electrode (104, 207, 304) and a control electrode (114) to maintain a constant tunneling current. In the preferred embodiment, two cantilever portions (108, 110) extend from the wafer surface (100). In a further embodiment, three portions (206, 208, 210) extend from the substrate (100). In an alternate embodiment, a counter electrode (304) having a varying width is fabricated.

25 Claims, 3 Drawing Sheets

METHOD AND APPARATUS FOR SENSING INFRARED RADIATION UTILIZING A MICRO-ELECTRO-MECHANICAL SENSOR

BACKGROUND OF THE INVENTION

1. Field of the Invention

The present invention generally relates to the field of micro-electro-mechanical (MEM) sensors for measuring infrared radiation, and more specifically to a tunneling tip infrared radiation detection device.

2. Description of the Related Art

Photoelectric sensors provide a precise mechanism by which infrared radiation is detected. However, in order to achieve a reasonable signal-to-noise ratio, these sensors must be cryogenically cooled. For example, such devices must be cooled to liquid nitrogen temperatures, requiring exotic coolants and insulation schemes for proper functioning. Consequently, these devices are extremely expensive to manufacture and not cost effective, require high maintenance, and are generally inapplicable for every day room temperature applications.

Unlike cryogenically cooled photoelectric sensors, bi-metallic strip thermostats can be used in most everyday thermal detection applications. Essentially, bi-metallic thermostats are narrow strips consisting of a first metal welded to a second different metal. If this bi-metallic strip is heated and if the coefficients of linear expansion of these metals differ, the strip will bend or flex in proportion to the amount of infrared radiation incident upon the strip. The amount of deflection can then be used to determine a difference in temperature (i.e. thermal or infrared radiation).

The interrelationship between the heated bi-metallic strips' deflection and the change in temperature ($t-t_0$) can be determined as follows. If the bi-metallic strip has a thickness h, a first metal having a coefficient of expansion $\alpha_1$ and a second metal having a coefficient of expansion $\alpha_2$, heating of the metal strip will result in the bending of the strip. This bending defines a radius of curvature of the strip. Generally, the radius of curvature of the bi-metallic strip $\rho$ is calculated as follows:

$$\rho = \frac{h(14 + n + 1/n)}{24(\alpha_2 - \alpha_1)(t - t_0)}$$

where n is the ratio of the moduli of elasticity of the first metal $E_1$ with respect to the second metal $E_2$ (i.e. $n=E_1/E_2$). The radius of curvature $\rho$ is proportional to the difference in elongation of the two metals and inversely proportional to the thickness of the strip. Given $\rho$, the amount of deflection $\Delta$ experienced by the strip can be easily obtained:

$$\Delta = l^2/8\rho$$

where l equals the length of the strip. By substituting the radius of curvature $\rho$ into the equation for the deflection $\Delta$, the deflection $\Delta$ can be represented as being directly proportional to the difference in temperature $t-t_0$:

$$\Delta = K*(t-t_0)$$

where K is a constant. Therefore, if the deflection $\Delta$ experienced by a bi-metallic strip can be accurately detected, the temperature change can be determined.

Although rigid and durable, bimetallic thermostats have a variety of disadvantages. For example, most bi-metallic thermostats are bulky and therefore inapplicable for small scale applications. In addition, current methods to detect the amount of strip deflection after heating are not very accurate. For example, most bi-metallic thermostats have a 10° (i.e. 6° K.) variance. Therefore, bi-metallic thermostats are generally not suitable for sensitive applications. Bi-metallic thermostats are also very sensitive to external noise including vibration, movement and acceleration.

Because of the disadvantages of cryogenetically cooled and bimetallic thermometers, there exists a need for a cost effective and accurate temperature detection device which does not require to be operated at cryogenic temperatures, can operate reasonably for all general applications at room temperatures, has an acceptable signal-to-noise ratio, is easy to manufacture, requires substantially less maintenance than existing photoelectric sensors and is not as susceptible to external noise as existing bi-metallic strip thermostats.

SUMMARY OF THE INVENTION

To solve the problems associated with cryogenically cooled photo sensors and with bi-metallic strip thermostats, the present invention combines the inherent advantages of tunneling tip transduction with the theory of bi-metallic thermal radiation detection. By making a micro-mechanical flexible bi-metallic infrared detection device, a very accurate air cooled tunneling tip sensor having an improved signal-to-noise ratio and requiring low maintenance is realized.

In tunneling tip sensors, a bias voltage is applied across a flexible counter electrode and a tunneling tip with a sufficiently small gap between the two components to induce a tunneling current to flow. The tunneling current $I_T$ is given by: $I_T \propto V_B \exp(-\alpha d \sqrt{\phi})$, where $V_B$ is the bias voltage, $\alpha$ is a constant, d is the electrode-to-tip separation and $\phi$ is the work function. As the applied force changes, the separation between the electrode and the tip changes and modulates the tunneling current, which varies by approximately a factor of two for each angstrom (Å) of electrode deflection. Tunneling currents are typically $1\eta A$ and the current noise is typically $10^{-13}$ Amp.Hz½. Thus, tunneling tip detectors can provide a much greater sensitivity and a larger bandwidth than previous methods of detection and still provide easily measurable signals.

Various structures for a cantilever beam tunneling rate device which measures acceleration are disclosed in a related copending application Serial No. 08/522,878 naming inventor R. L. Kubena et al., and entitled "Tunneling-Based Rate Gyros with Simple Drive and Sense Axis Coupling." A single cantilever beam rotational sensor includes a z-axis sensor and a control circuit. In addition, two lateral control electrodes are disposed adjacent to the cantilever electrode of the sensor. The lateral control electrodes are modulated with a voltage to induce a lateral vibration at a known maximum velocity $V_1$. The sensor measures the Coriolis force $F_c$ given by: $F_c = \frac{1}{2}*m*W_r \times V_1$ where m is the cantilever electrode's mass, $W_r$ is the rotational rate and $V_1$ is the cantilever electrode's lateral velocity. The rotational rate can be determined by measuring the Coriolis force, which is directly proportional to the rotation.

The cantilever and tunneling electrodes form a circuit that produces an output signal. A force applied to the sensor urges the cantilever electrode to deflect relative to the tunneling electrode to modulate the output signal. The output signal is a control voltage that is applied between the cantilever electrode and a control electrode to maintain a constant tunneling current. In one embodiment, a cantilever electrode having a plurality of portions extending from the substrate is fabricated on the substrate surface. In an alternative embodiment, a cantilever having a varying width is fabricated.

The present invention provides an apparatus and method for infrared radiation detection. A surface micromachined (as opposed to bulk micromachined) tunneling rate based infrared radiation device, which is operable at room temperature, has increased accuracy over existing bi-metallic thermostats, results in simple device geometries, increased effective band-width, and reduced high frequency "noise" is disclosed. Surface micro-machining provides a low cost, high yield process for manufacturing since it is inherently compatible with integrated circuit (IC) fabrication.

These goals are achieved with a tunneling rate based infrared radiation device that has a unitary structure and is formed on a single semiconductor substrate. A flexible counter electrode is comprised of a first material. A second material, having a coefficient of expansion different than the first material, is disposed on the counter electrode. A third material is disposed on the second material. Preferably, the flexible counter electrode is fabricated having one or more portions extending from the substrate surface. Alternatively, the counter electrode has three portions extending from the semiconductor surface. The intersection of the three portions is positioned over the tunneling electrode.

The counter electrode is suspended above the substrate at a distance from the tunneling electrode such that a tunneling current flows between the counter electrode and the tunneling electrode. This current flows in response to a bias voltage which is applied across the bi-metallic electrode and the tunneling electrode.

The counter electrode and tunneling electrode form a circuit that produces an output signal. When the counter electrode is exposed to infrared radiation, the differential in coefficients of expansion between the first and second materials urges the counter electrode to deflect relative to the tunneling electrode, thereby modulating the output signal. Since the modulated signal is proportional to the deflection of the electrode, and the deflection of the bi-metallic electrode is proportional to the difference in temperature, this device accurately detects changes in temperature.

In another preferred embodiment, a bi-metallic counter electrode having a varying width is fabricated. Alternatively, lateral control electrodes are fabricated to produce a lateral motion of the counter electrode such that the sensor detects a rotation. Rotational detection allows the thermal radiation detection device to negate any noise associated with acceleration. The lateral counter electrodes produce lateral forces that oscillate the counter electrode in response to a corresponding oscillating voltage across the lateral control electrodes and counter electrode. When the sensor is rotated about an axis parallel to the counter electrode, the applied force is proportional to the rotational rate.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
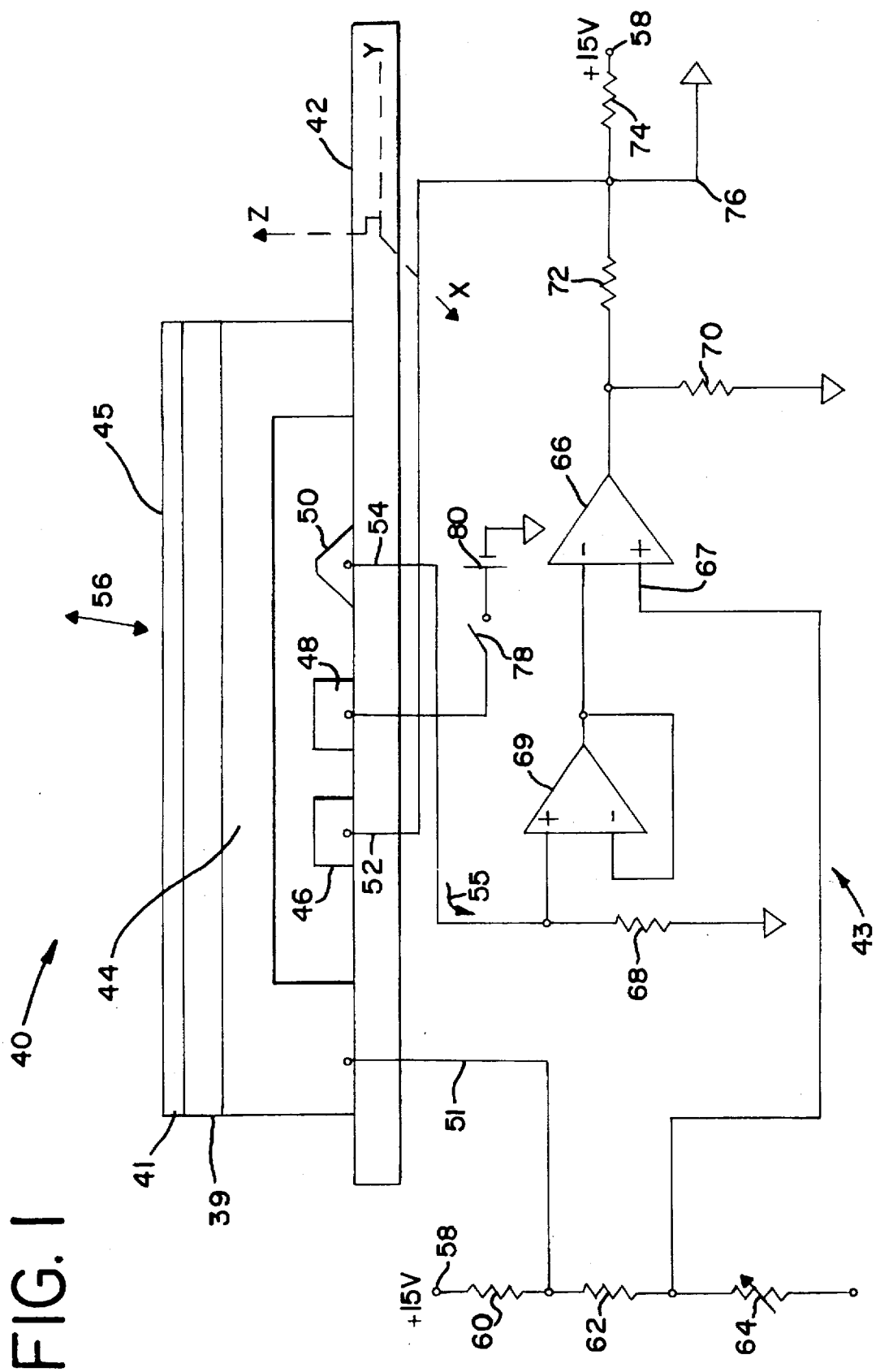
FIG. 1 is a sectional view of a z-axis tunneling sensor including a schematic diagram of an analog feedback circuit that may be utilized in a preferred embodiment of the invention.

FIG. 1 shows a sectional view of a z-axis tunneling tip sensor 40 without lateral control electrodes, together with an analog feedback circuit 43, which is one type of circuit that may be utilized in a preferred embodiment of the invention. The z-axis tunneling tip sensor can be fabricated on a semiconductor wafer that lies in the plane defined by the x and y axes.

The analog feedback circuit 43 applies a control voltage via leads 51 and 52 across the counter electrode 44 and the control electrode 46 to create an attractive electric field which urges the counter electrode 44 down to a reference position close to the tunneling tip 50, e.g., 1–2 ηm away from the tip 50. The circuit also applies a bias voltage via leads 51 and 54 across the counter electrode 44 and tip 50 sufficient to initiate a flow of tunneling current 55 through them. The circuit 43 is designed to respond to a deflection of electrode 44 by modulating the control voltage while holding the tunneling current constant, so that the value of the control voltage at any given time indicates the degree of electrode flexure.

The counter electrode 44 is composed of a first material type having a first coefficient of linear expansion $\alpha_1$. A second material 39 having a second coefficient of linear expansion $\alpha_2$ is disposed on the counter electrode 44. A third material 41 is disposed on the second material 39. The difference between the first $\alpha_1$ and second $\alpha_2$ coefficients of linear expansion defines a differential in coefficient of expansion.

Preferably, the second material 39 is a metal having high conductivity, e.g. copper and the first material 44 is silicon. The third material 41 may be preferably copper which has been treated to become infrared absorbing. Copper is preferred because of its coefficient of thermal expansion $\alpha$. Silicon is preferred because of its low coefficient of thermal expansion $\alpha$. Most preferably, copper ebanol-c treated is the third material 41 and the preferred infrared radiation absorber 45. Preferably, the thickness of the second material 39 is 1–2 ηm whereas the thickness of the counter electrode 44 is 2 ηm.

Electrode flexure is caused when infrared radiation strikes the IR-absorber 45, which, because of the differential in coefficient of expansion, causes the counter electrode 44 to bend. This flexure causes the tunneling current 55 to vary. In an alternative embodiment, the control voltage could be held constant and tunneling current 55 modulated, or a combination of both approaches could be used, but modulating the control voltages makes the device less susceptible to damage and effectively linearizes the output signal.

In the circuit 43 a supply voltage is applied via a reference terminal 58 across a series connection of resistors 60, 62 and a variable resistor 64, preferably 1 MΩ, 10 kΩ and nominally 2 kΩ to ground reference potential. The counter electrode 44 is electrically connected to the junction of resistors 60 and 62, and the junction of resistors 62 and 64 is connected to the non-inverting input 67 of an operational amplifier 66 to provide a reference voltage. The tunneling electrode 50 is connected through an input resistor 68 to ground reference potential, and is also connected to the non-inverting input of an operational amplifier 69. The amplifier 69 is connected as a voltage follower, with its output connected to the inverting input of the amplifier 66. The output of amplifier 66 is connected through a resistor 70, preferably 10 kΩ, to ground potential and through a series connection of resistors 72 and 74, preferably 4 MΩ and 1 MΩ, to the supply potential terminal 58. The junction of resistors 72 and 74 is electrically connected to control electrode 46 via line 52 to provide the control voltage, which is monitored at output node 76 and is generally proportional to an applied force 56. The value of resistor 64 is selected to establish a reference value of tunneling current, preferably 1 ηA.

The applied force 56, which in the preferred embodiment is caused by the infrared radiation absorber 45 being exposed to infrared radiation, tends to deflect the electrode 44. Deflection can either be concave or convex. In the former, the counter electrode 44 bends upwards and occurs when the coefficient of expansion $\alpha_1$ for material 39 is less than the coefficient of expansion $\alpha_2$ for material 44. Conversely, where the coefficient of expansion $\alpha_1$ for material 39 is greater than the coefficient of expansion $\alpha_2$ for material 44, the electrode 44 bends downwards.

Deflection initially alters the tunneling current 55 and produces unbalanced differential inputs for amplifier 66. The amplifier responds by modulating the control voltage on lead 52 to produce an opposing force to the applied force, thus maintaining a constant counter electrode-to-tunneling electrode separation and a constant tunneling current 55. If the applied force 56 causes the electrode to bend upwards, the separation increases and the tunneling current 55 decreases such that the voltage at the non-inverting input of amplifier 66 is more than the voltage at its inverting input. The amplifier's output is positive, and thus increases the control voltage and the attractive force on the counter electrode to bring it back to the reference position. Conversely, if the applied force deflects the counter electrode downwards, the tunneling current 55 increases and the amplifier's output goes negative, thus reducing the attractive force and allowing the counter electrode to pull itself back to the reference position. Without its feedback circuit, the electrode 44 can deflect excessively and damage the tunneling electrode. Furthermore, in the absence of a feedback circuit the sensor's output would be linear only over very small deflections.

The sensor 40 is calibrated periodically by closing a switch 78 to apply a known voltage from a DC source 80 to the test electrode 48 to simulate an applied force, and measuring the resulting output (calibration) voltage. In normal operation, the output would be scaled by the calibration response to produce a normalized output that compensates for drifts in the sensor performance caused by temperature changes, component aging and the like. Each of the infrared detection devices described may use this type of circuit for its operation.

Figure 2:
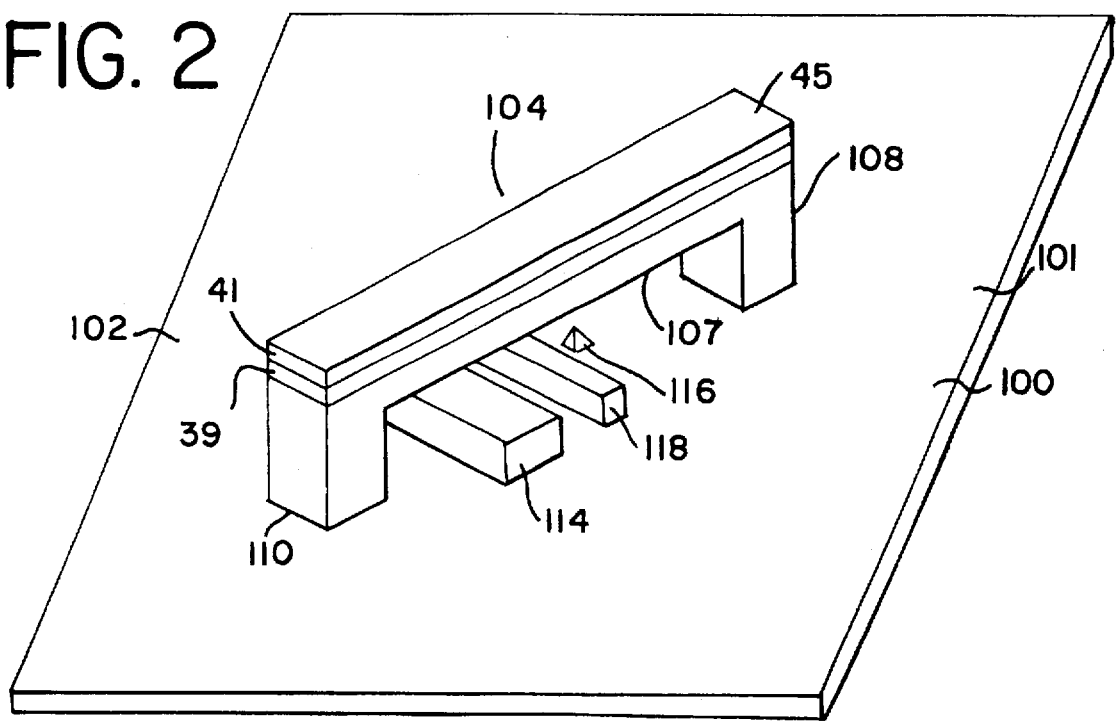
FIG. 2 is a perspective view of a preferred embodiment of a rate-based infrared radiation sensor having two counter electrode portions extending from the substrate and implementing the analog feedback circuit shown in FIG. 1.

FIG. 2 is a perspective view of a tunneling rate-based infrared detection device 102 having a counter electrode 104. This device 102 is formed on a semiconductor wafer 100 and can be operated via a control circuit which is essentially the same as the circuit 43 of FIG. 1. The bi-metallic counter electrode 104 extends over the surface 101 of the wafer 100 and over the tunneling electrode 116.

A plurality of electrode portions extend from the surface 101 of the wafer 100. Preferably, a first portion 108 of the counter electrode 104 and a second portion 110 extend from the surface 101 of the wafer 100 and intersect one another over the tunneling electrode 118. Preferably, the tunneling tip electrode 116 is located beneath the counter electrode 104, equidistant from the first portion 108 and the second portion 110. In an alternative embodiment, this tunneling electrode 116 could be manufactured on the underside 107 of the counter electrode 104.

In the preferred embodiment, a counter electrode 104 of a first material is disposed on the semiconductor surface 101. A second material 39 is disposed on the counter electrode 104. Preferably, this second material 39 is a metal having a high conduction rate such as copper. A third material 41 is disposed on this second material 39. This third material 41 defines the infrared radiation (IR) absorber 45 of the device 102. Most preferably, this third material 41 is blackened copper. The preferred process for blackening copper is ebanol-c treated copper and is well known in the metallurgical arts.

A control electrode 114 is formed adjacent to the first counter electrode portion 110. A test or calibration electrode 118 is also fabricated on the wafer surface 101. The test electrode 118 is located below the electrode 104 and adjacent the control electrode 114. The test electrode 118 applies a test force to the electrode. This test force produces a calibration current in response to this voltage across the calibration electrode 118 and the counter electrode 104.

Figure 3:
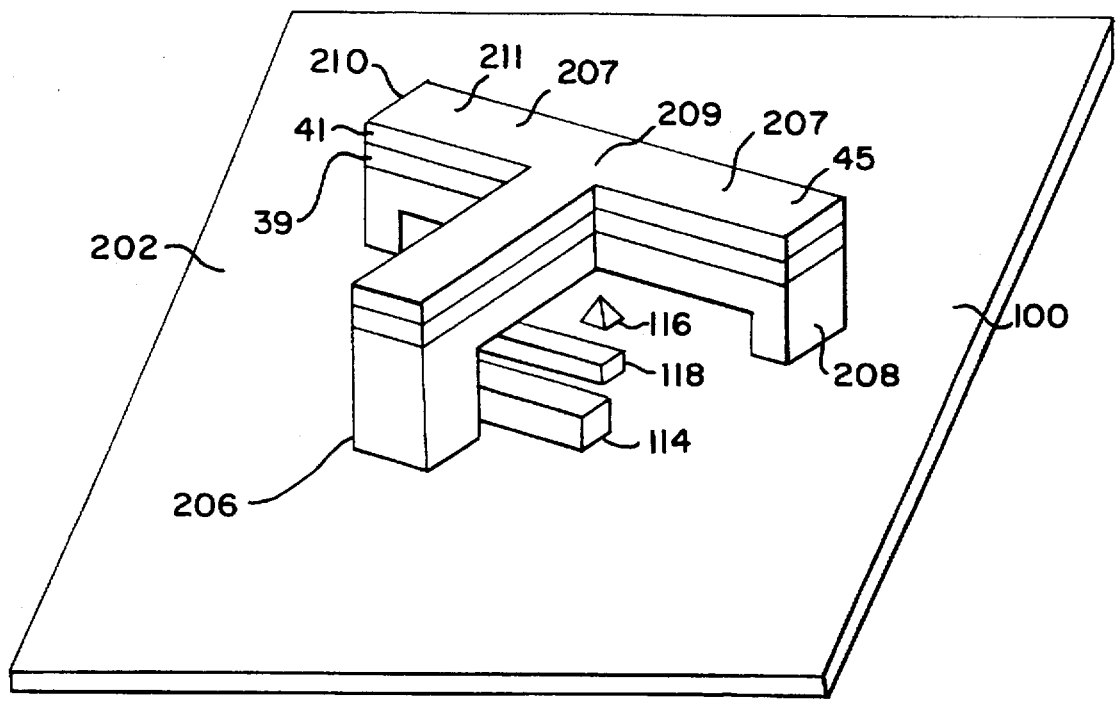
FIG. 3 is a perspective view of a preferred embodiment of a rate-based infrared radiation sensor having a counter electrode strap and implementing the analog feedback circuit shown in FIG. 1.

FIG. 3 is a perspective view of an IR detection device having a counter electrode strap 202. This device 202 is formed on a semiconductor wafer 100. This device can be operated via a control circuit which is essentially the same as the circuit 43 of FIG. 1. The counter electrode 207 extends over the surface 101 of the wafer 100 and over the tunneling electrode 116. Three portions of the counter electrode 206, 208 and 210 extend from the surface 101 of the wafer 100. Counter electrode portions 206, 208 and 210 extend from the wafer surface 101 and intersect one another at intersection 209. Portions 208 and 210 form an electrode strap 211.

A control electrode 114 is formed adjacent to the first counter electrode portion 206. A test or calibration electrode 118 is also fabricated on the wafer surface 101. The test electrode 118 is located below the electrode 104 and adjacent the control electrode 114. This test electrode 118 functions similarly as the test electrode 118 described in FIG. 2. In this preferred embodiment, a tunneling electrode 116 is situated below the intersection 209 of the electrode strap 211 and the counter electrode portion 206. In an alternative embodiment, the tunneling electrode 116 may be manufactured underneath the counter electrode strap 211.

In FIG. 3, the essential features of this design are that a simple surface micromachined process can be used to fabricate the tunneling tip 116 and counter electrode 104 on a single semiconductor wafer 100. The tunneling tip 116 is located under a node (which is stationary) for lateral vibrations of the counter electrode 207 so that tunneling current is always maintained with low noise regardless of the amplitude of any possible lateral vibration.

Figure 4:
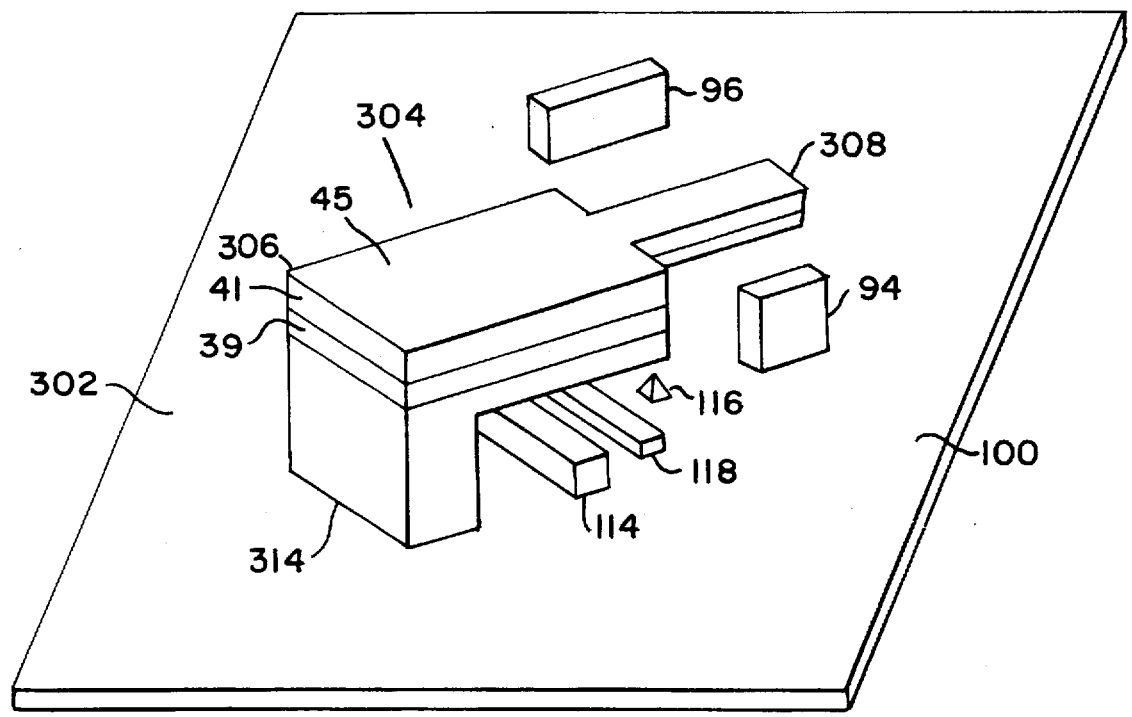
FIG. 4 is a perspective view of a preferred embodiment of a rate-based infrared radiation device having non-uniform width and implementing the analog feedback circuit shown in FIG. 1.

FIG. 4 is a perspective view of a non-uniform width rate-based infrared radiation detection device 302. In this embodiment, the counter electrode 304 defines a cantilever since the counter electrode is a projecting beam supported at only one end. This device 302 can be operated by a control circuit similar to that circuit 43 provided in FIG. 1. The device 302 is formed on a surface 101 of a semiconductor wafer 100. A first cantilever portion 314 extends from the substrate surface 101.

The cantilever electrode 304 extends over the surface 101 of the wafer 100 and over a tunneling electrode 116. The cantilever electrode 304 has a narrow portion 308 and a wide portion 306. In this preferred embodiment, the tunneling electrode 116 is a tunneling tip and positioned under the wider portion 306 of the cantilever electrode 304 for maximum sensitivity. A control electrode 114 is formed adjacent to the first cantilever portion 314. A test or calibration electrode 118 is also fabricated on the wafer surface 101. The test electrode 118 is located below the cantilever 308 and adjacent the control electrode 114. This test electrode functions similarly as the test electrode 118 described in FIGS. 2 and 3.

Alternatively, two lateral control electrodes 94,96 are disposed adjacent the cantilever electrode 304. Preferably, these two lateral control electrodes are disposed adjacent the narrower portion 308 of the cantilever electrode 304. The lateral control electrodes 94,96 are modulated in synchronism with a voltage to induce a lateral vibration at a known maximum velocity $V_1$ in the cantilever electrode. The lateral control electrodes 94,96 drive the cantilever electrode 304 at the lateral resonant frequencies of the cantilever electrode. The first and second lateral control electrodes (94 and 96, respectively) produce lateral forces which oscillate the cantilever electrode in response to a corresponding oscillating voltage across the lateral control electrodes 94,96 and cantilever electrode.

When the device 302 is rotated about an axis parallel to the cantilever electrode, the applied force is proportional to the rotational rate. The two lateral control electrodes 94,96 are driven 180° out of phase such that the voltages applied to the respective lateral electrodes 94,96 are modulated in synchronism and the cantilever electrode is driven in the lateral direction. By driving the cantilever electrode in the lateral direction, the device can sense the Coriolis forces $F_c$ in the vertical direction. The Coriolis force $F_c$ given by $F_c = \frac{1}{2} \ast m \ast W \ast V$ where m is the cantilever electrode's lateral velocity. The rotational interference can then be determined by measuring the Coriolis force, which is directly proportional to the rotation. The non-uniform width informed detection device 302 measures a Coriolis force $F_c$ given by $F_c = \frac{1}{2} \ast m \ast W \ast V$ where V is the cantilever electrode's 308 lateral velocity. The rotational rate can be determined by measuring the Coriolis force, which is directly proportional to the rotation.

In this embodiment, lateral accelerations can also produce lateral deflections of the cantilever electrode 308. However, because the tunneling electrode 310 is positioned under the wider portion 306 of the cantilever electrode 304, lateral excursions of the narrower portion 308 of the cantilever electrode 304 will not result in significant motion above the tunneling tip 311. The ratio of widths between the wide portion 306 and narrow portion 308 of the cantilever 304 will determine the lateral motion above the tunneling tip 311 for a given lateral amplitude of the end 313 of the cantilever 304.

In FIG. 4, the position of the lateral control electrodes 94,96 adjacent the cantilever will vary as the device structure varies. Preferably, the lateral control electrodes 94,96 have been placed approximately ten percent of the overall length of the cantilever electrode away from the cantilever. In the preferred embodiments, the width of the lateral control electrodes 94,96 have been approximately ten percent of the overall length of the cantilever electrode.

For example, for a cantilever electrode with a length of 250 microns, lateral control electrodes 94,96 having a width of approximately 25 microns are placed approximately 25 microns from the end of the cantilever electrode. The amplitude of the lateral motion of the cantilever can be detected by a high frequency capacitance sense circuit whose signal can be superimposed on the drive electrodes or additional sense electrodes placed near the drive electrodes can be easily added.

Device encapsulation can be accomplished with several packaging designs if needed for environmental control or vacuum operation. In each of the cantilevers disclosed in FIGS. 2, 3, and 4, one end of a counter electrode is suspended approximately 1 to 2 microns above the wafer's surface 101. In an alternative embodiment, the tunneling tip 116 is formed on the underside of counter electrode instead of on the tunneling electrode. This tunneling tip may be formed by etching a tapered impression with a shape complementary to the desired tip shape. The result is a cantilever electrode with a tunneling tip suspended above the tunneling electrode.

The described device structures have several advantages. Because these structures utilize tunneling tip sensing, these infrared radiation detection devices possess accurate sensitivity at room temperatures. By reducing the requirement for super cooling, the requirement for exotic coolants and insulation schemes is eliminated. These less complex devices decrease expensive manufacturing costs and reduce the need for non-standard operating environments, provide continuous monitoring of the tunneling current during operation and reduces high frequency "noise" on the signal due to surface roughness of the tunneling counter electrode.

While several illustrative embodiments of the invention have been shown and described, numerous variations and alternative embodiments will occur to those skilled in the art. Such variations and alternate embodiments are contemplated, and can be made without departing from the spirit and scope of the invention as defined by the appended claims.

We claim:

1. An infrared radiation detection device, comprising:
   a semiconductor substrate;
   a tunneling electrode on said substrate;
   a counter electrode of a first solid material, said counter electrode extending from said substrate;
   a second solid material disposed on said counter electrode, said second solid material having a coefficient of expansion different than said first solid material; and
   an infrared absorbing material disposed on said second solid material;
   wherein said counter electrode is suspended above said substrate at a distance from said tunneling electrode so that a tunneling current flows between said counter electrode and said tunneling electrode in response to a bias voltage applied across said counter electrode and said tunneling electrode.

2. The device of claim 1, wherein said counter electrode has a first, a second and a third portion extending from said substrate.

3. The device of claim 2, wherein said first, second and third counter electrode portions intersect at a point above said substrate.

4. The device of claim 1, wherein said counter electrode and said tunneling electrode form a part of a circuit that produces an output signal such that when said infrared absorbing material is exposed to infrared radiation, a differential in coefficients of expansion urges said counter electrode to deflect relative to said tunneling electrode thereby modulating said output signal.

5. The device of claim 4, further comprising a control electrode on said substrate below said counter electrode, said circuit providing a control voltage as said output signal across said counter electrode and said control electrode to control the position of said counter electrode, and modulating said control voltage to maintain said tunneling current at a substantially constant level.

6. The device of claim 1, wherein said tunneling electrode comprises a tunneling tip.

7. The device of claim 1, wherein said tunneling electrode comprises a tunneling tip.

8. The device of claim 1, further comprising a calibration electrode on said substrate below said counter electrode for applying a test force to said counter electrode to produce a calibration signal in response to a test voltage applied across said calibration electrode and said counter electrode.

9. The device of claim 1, wherein said first solid material is a first metal and said second solid material is a second metal, said second metal having a high thermal conductivity.

10. The device of claim 9, wherein said first metal is silicon and said second metal is copper.

11. A device for sensing temperature, the device comprising:
a semiconductor substrate;
a tunneling electrode on said substrate;
a counter electrode of a first solid material, said counter electrode extending from said substrate; and
a second solid material having a coefficient of expansion different than said first solid material, said second solid material being disposed on said counter electrode;
wherein said counter electrode is suspended above said substrate at a distance from said tunneling electrode so that a tunneling current flows between said counter electrode and said tunneling electrode in response to a bias voltage applied across said counter electrode and said tunneling electrode.

12. The device of claim 11, wherein said counter electrode and said tunneling electrode form a part of a circuit that produces an output signal representative of the temperature such that said differential in coefficients of expansion urges said counter electrode to deflect relative to said tunneling electrode thereby modulating said output signal.

13. The device of claim 12, further comprising an infrared radiation absorber disposed on said second solid material such that said output signal is indicative of infrared radiation incident on said device.

14. The device of claim 13, wherein said tunneling electrode comprises a tunneling tip.

15. The device of claim 13, wherein said counter electrode comprises a wider portion and a narrower portion and wherein said tunneling electrode remains under said wider portion of said counter electrode during lateral motions of said narrower portion of said counter electrode.

16. The device of claim 13, further comprising a control electrode on said substrate below said counter electrode, said circuit providing a control voltage as said output signal across said counter electrode and said control electrode to control the position of said counter electrode, and modulating said control voltage to maintain said tunneling current at a substantially constant level.

17. The device of claim 15, further comprising first and second lateral control electrodes on said substrate adjacent said narrower portion of said counter electrode.

18. The device of claim 13, further comprising a calibration electrode on said substrate below said counter electrode for applying a test force to said counter electrode to produce a calibration signal in response to a test voltage applied across said calibration electrode and counter electrode.

19. The device of claim 11, wherein said first solid material is a first metal and said second solid material is a second metal, said second metal having a high thermal conductivity.

20. The device of claim 19, wherein said first metal is silicon and said second metal is copper.

21. An infrared radiation detection device, comprising:
a substrate;
an electrode on said substrate;
a bi-metallic electrode extending from said substrate and comprising a first metal portion and a second metal portion, said first metal portion having a different coefficient of expansion than said second metal portion; and
an infrared radiation absorber disposed on said bi-metallic electrode;
said bi-metallic electrode having a portion spaced from said substrate at a distance from said electrode on said substrate such that a tunneling current flows between said bi-metallic electrode and said electrode on said substrate in response to a bias voltage applied across said bimetallic electrode and said electrode on said substrate.

22. A method for detecting infrared radiation using a device comprising a tunneling electrode, a control electrode, a counter electrode of a first solid material, a second solid material disposed on said counter electrode, said second solid material having a coefficient of expansion different than said first solid material, and an infrared absorbing material disposed on said second solid material, the method comprising the steps of:

(a) applying a control voltage across said counter electrode and said control electrode to place said counter electrode in a reference position suspended from said tunneling electrode and said control electrode;

(b) applying a bias voltage across said counter electrode and said tunneling electrode to establish a tunneling current therebetween;

(c) exposing said infrared absorbing material to infrared radiation to urge said counter electrode to deflect relative to said tunneling electrode; and (d) detecting said infrared radiation by monitoring at least one of said control voltage and said tunneling current.

23. The method of claim 22, wherein step (d) comprises the steps of:
maintaining said tunneling current at a substantially constant level; and
measuring an extent to which said control voltage changes in response to exposure of said infrared absorbing material to said infrared radiation.

24. The method of claim 22, wherein said device further comprises a calibration electrode, the method further comprising the steps of:
applying a test voltage across said calibration electrode and said counter electrode;
maintaining said tunneling current at a substantially constant level; and
measuring an extent to which said control voltage changes.

25. The method of claim 22, wherein said counter electrode comprises a cantilever electrode and said device further comprises a pair of lateral control electrodes disposed adjacent said cantilever electrode, the method further comprising the steps of:

applying an oscillating voltage between said pair of lateral control electrodes and said cantilever electrode to induce a lateral vibration of said cantilever electrode;

maintaining said tunneling current at a substantially constant level; and measuring an extent to which the control voltage changes to determine an amount of rotational interference.

* * * * *